(No Model.) 2 Sheets—Sheet 1.

J. W. BROWN, Jr.
MEAT CUTTER.

No. 424,758. Patented Apr. 1, 1890.

Witnesses:
Alex. Barkoff
John E. Parker

Inventor:
John W. Brown, Jr
by his Attorneys
Howson & Howson (No Model.) 2 Sheets—Sheet 2.

J. W. BROWN, Jr.
MEAT CUTTER.

No. 424,758. Patented Apr. 1, 1890.

Witnesses:
Alex. Barkoff
John E. Parker

Inventor:
John W. Brown, Jr
by his Attorneys
Howson & Howson

UNITED STATES PATENT OFFICE.

JOHN WILSON BROWN, JR., OF PHILADELPHIA, PENNSYLVANIA, ASSIGNOR TO THE ENTERPRISE MANUFACTURING COMPANY OF PENNSYLVANIA, OF SAME PLACE.

MEAT-CUTTER.

SPECIFICATION forming part of Letters Patent No. 424,758, dated April 1, 1890.

Application filed October 13, 1887. Serial No. 252,213. (No model.)

*To all whom it may concern:*

Be it known that I, JOHN WILSON BROWN, Jr., a citizen of the United States, and a resident of Philadelphia, Pennsylvania, have invented certain Improvements in Meat-Cutters, of which the following is a specification.

My invention relates to that class of meat-cutting machines which operate by forcing the mass of meat into the apertures of a perforated plate and cutting from the mass the portions which project into the apertures by means of rotating knives working against the face of the plate; and the objects of my invention are to simplify and cheapen the construction of such machines, to more nearly equalize the feeding and cutting capacities, and to prevent the clogging of the knife or knives by strings or sinews.

Figure 1:
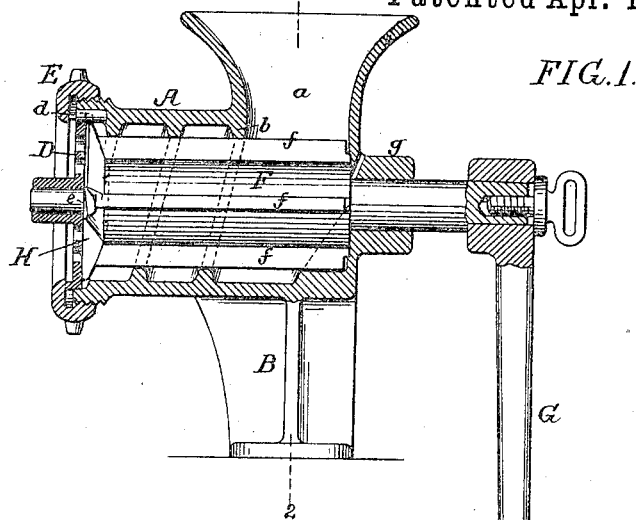
Figure 2:
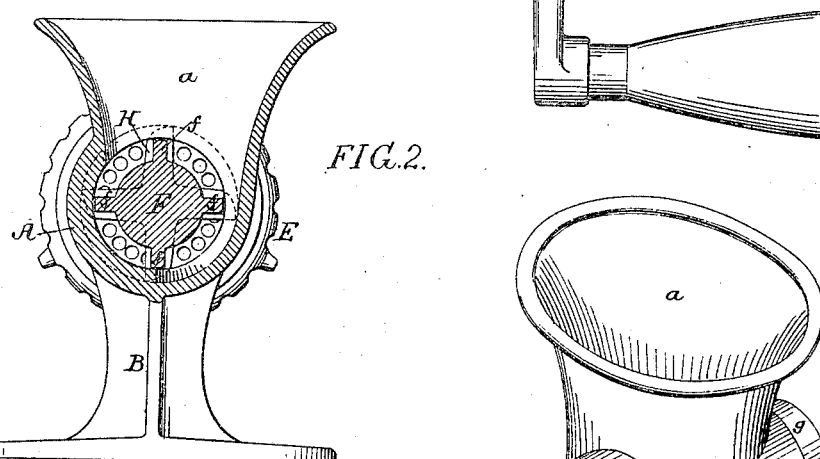
Figure 3:
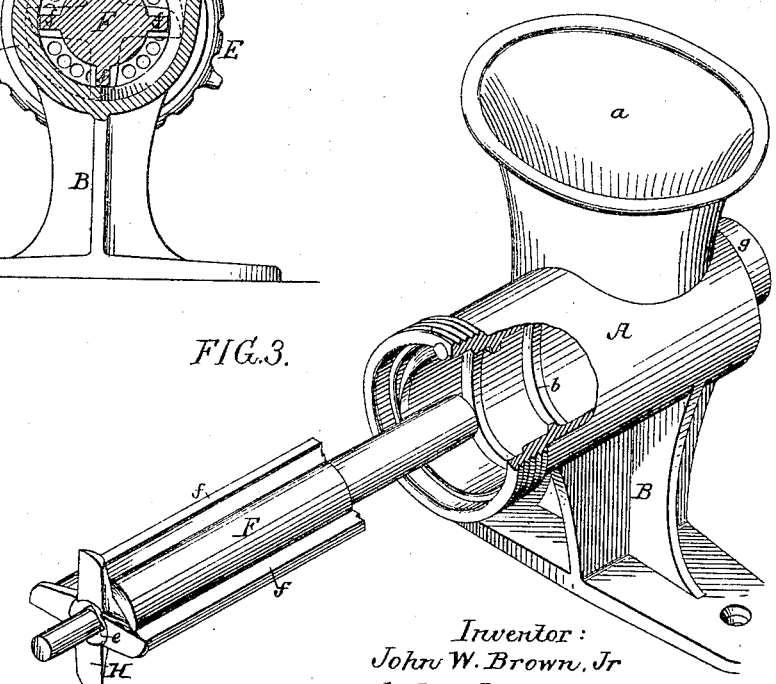
Figure 4:
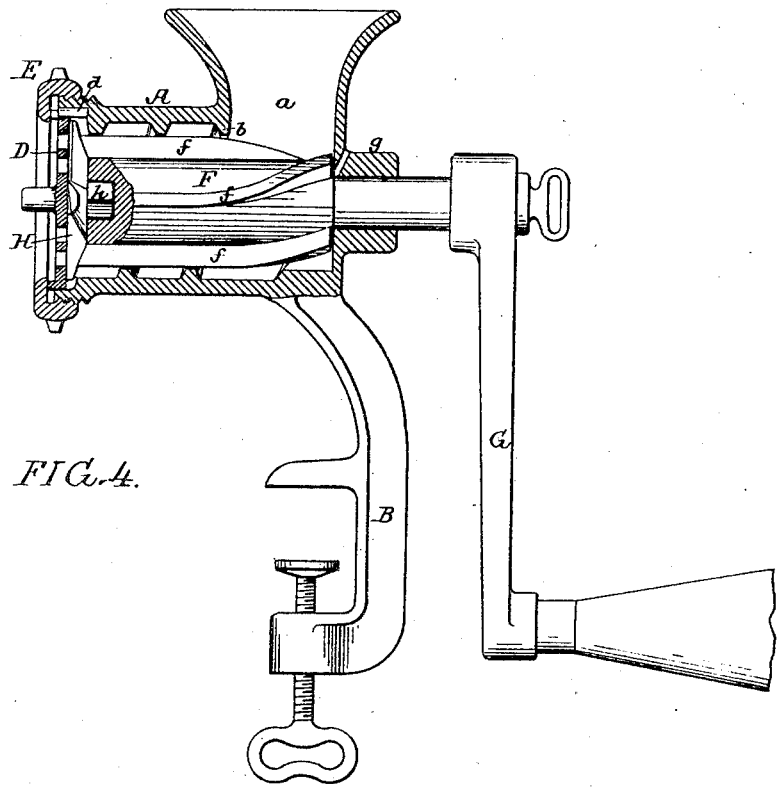
Figure 6:
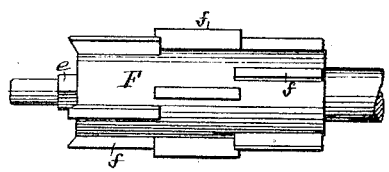
Figure 5:
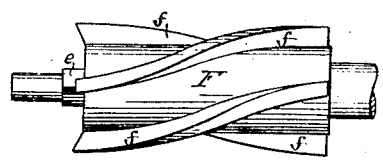

In the accompanying drawings, Figure 1 is a longitudinal section of my improved meat-cutter. Fig. 2 is a transverse section on the line 1 2, Fig. 1. Fig. 3 is a perspective view showing the parts detached. Fig. 4 is a longitudinal section of a modification, and Figs. 5 and 6 are views of modified forms of ribbed shaft.

Referring to Figs. 1, 2, and 3, A is a casing, preferably cast in one piece. $a$ is a hopper situated at one end of the casing, and, for a purpose described hereinafter, somewhat eccentric therewith, as shown in Fig. 2.

The casing A is supported in the present instance by a leg B, cast with the casing and adapted to be secured to a table or other fixture, although the leg may be provided with a clamp by which it is secured to the table, as in other machines of this class, and as shown in Fig. 4.

The casing A is provided with an internal spiral rib $b$, and in the present instance is of greater pitch at the rear or hopper end of the casing than at its front or delivery end. The rear end of this casing is closed, while the front end is open and provided with a perforated plate D, which is prevented from turning in the casing by a pin $d$ entering a notch in the periphery of the plate. This plate is secured to the casing by a confining-ring E, having a screw-thread or cam adapted to a screw-thread or cam on the casing.

Contained within the casing A is a shaft or spindle F, having a series of longitudinal ribs or wings $f$, (four in the present instance.) This shaft has its bearings in the rear casing $g$ and in the perforated plate D, and is provided with a suitable handle G, preferably detachable.

The outer end of the shaft F is reduced considerably, and over a squared portion $e$ thereof fits the hub of a many-bladed knife H, of the construction usual in this class of machines, or, as shown in Fig. 4, a projection $h$ on the back of the knife H may fit into a cavity in the end of the shaft and the bearing in the perforated plate dispensed with. In the present instance I have shown a knife having four blades, to correspond to the number of the ribs $f$ of the casing, and radiating on the same lines with said ribs, which extend to or as nearly to the rear of the blades as possible and yet allow the knife the slight amount of play on the shaft necessary to secure by adjustment operative contact between the blades and the face of the plate at all times. The extension of the ribs to or nearly to the knife prevents to a great extent the accumulation around and in rear of the blades of the knife of stringy sinews of meat to be cut, thus avoiding clogging of the knives and consequent friction from this cause.

The hopper A is placed somewhat eccentrically of the casing, as shown in Fig. 2, so that the ribs of the shaft may sieze upon a greater mass of and thus more firmly and powerfully act upon the meat than if the hopper was placed centrally above the casing.

The action of the machine is as follows: Meat being placed in the hopper A and the shaft revolved, the ribs on the shaft seize the meat, draw it into and give it a motion of rotation within the casing, while the spiral ribs $b$ force the meat to take a spiral path toward the perforated plate. By this combined action the meat is forced forward within the casing and against and into the apertures of the perforated plate at or about the speed of revolution of the shaft and with a power depending upon the pitch of the spiral rib of the casing. Consequently when the meat is presented to the plate it is traveling at or about the same speed as and in a direction corresponding to some extent with that of the knife; hence friction caused by the knife being compelled to cut its way through a surrounding mass of meat is avoided. The knife is free to do its intended work of cutting off from the mass the small portions which protrude or extend into the perforations of the plate, and thus the machine may be much more easily and evenly operated than would otherwise be the case.

It is obvious that the winged shaft F is a considerably simpler and cheaper device than the powerful feed-screws which it has heretofore been considered necessary to use for forcing the meat forward within the casing in this class of machines, while the casing itself is no more complex or expensive. The reaction of the pressure of the meat against the plate is taken directly by the casing and not indirectly through the medium of the shaft, as heretofore. I have found, furthermore, that by my plan of construction I can materially reduce the size of the machine, and consequently its cost, without material decrease in efficiency or capacity. By continuing the shaft in its full diameter to or nearly to the knife practically all the meat that enters the machine is cut up and forced out through the perforations in the plate.

The longitudinal ribs on the shaft F may be made slightly spiral at the feed end of the machine, as shown in Fig. 4, or throughout their length, as shown in Fig. 5, or the continuity of the ribs may be broken, as shown in Fig. 6, and the pitch of the spiral rib of the casing may be made greater or less than that shown without departing from my invention, so long as the ribs of the shaft F operate substantially only to rotate the meat within the casing, while the ribs of the casing operate to modify this motion into a forward motion in a spiral path.

I claim as my invention—

1. The combination of a casing having an internal spiral channel, a perforated plate and rotary knife coacting therewith, and a shaft having longitudinal ribs which carry the meat around with the shaft and cause it to travel in the spiral channel toward the perforated plate, substantially as set forth.

2. The combination, with the spirally-ribbed casing of a meat-cutter, of a shaft F, having longitudinal ribs substantially parallel throughout or nearly throughout their entire length with the line of the shaft, a perforated plate secured to the casing, and a knife carried by the shaft and coacting with the perforated plate to sever small portions from the meat, substantially as specified.

3. The combination of the casing having a spiral channel therein, a perforated plate and a rotary knife coacting therewith, and a shaft having longitudinal ribs which are in line with and extend to the blades of the knife, substantially as described.

4. The combination of a casing having a spiral rib therein, forming a continuous spiral channel from the hopper to the end of the casing, a perforated plate and a rotary knife coacting therewith, and a shaft having projections which carry the meat around with the shaft and cause it to traverse the spiral channel in the casing, substantially as described.

5. The combination of a casing having a hopper at one end, with a perforated plate at the opposite end, an internal spiral rib in said casing of a greater pitch at the hopper end than at the delivery end, with a longitudinally-ribbed shaft, a knife carried thereby coacting with the perforated plate, substantially as specified, In testimony whereof I have signed my name to this specification in the presence of two subscribing witnesses.

JOHN WILSON BROWN, JR.

Witnesses:
HENRY HOWSON,
HARRY SMITH.